April 6, 1948.  H. K. SANDELL  2,439,104
AMUSEMENT DEVICE
Filed Jan. 25, 1945

INVENTOR.
Henry K. Sandell
BY
His Attorney

Patented Apr. 6, 1948

2,439,104

UNITED STATES PATENT OFFICE 2,439,104

AMUSEMENT DEVICE

Henry K. Sandell, Chicago, Ill., assignor to Clarence E. Threedy, Chicago, Ill., as trustee Application January 25, 1945, Serial No. 574,486

3 Claims. (Cl. 46—122)

This invention relates to certain novel improvements in amusement devices and more particularly the invention relates to a mechanism for supporting an object in a manner so as to give the object animation.

The invention contemplates the employment of a traveling conveying line on which are supported objects simulating horses, and, as a primary object of this invention, is contemplated the employment of a balance spring which has the dual function of supporting the horse-simulating object in an upright position and yet of permitting the object to vibrate in the direction of its travel, thus simulating animation of the object.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
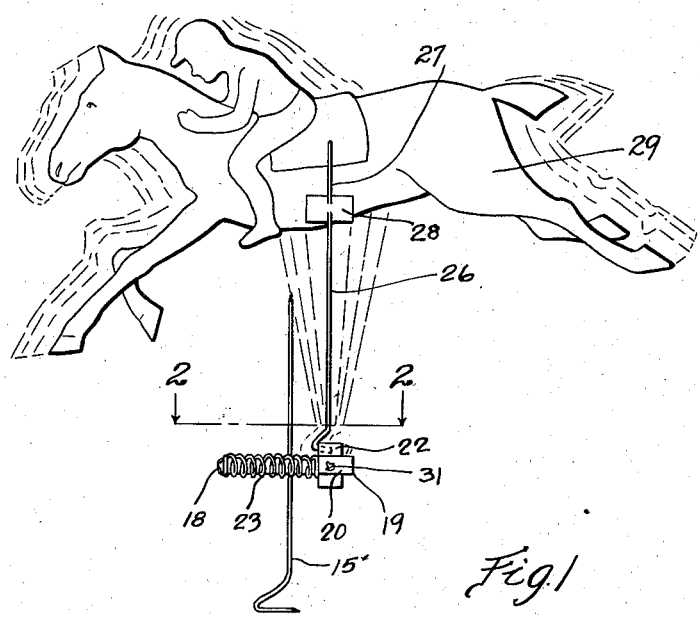
Fig. 1 is an enlarged side elevational view of the invention.
Figure 2:
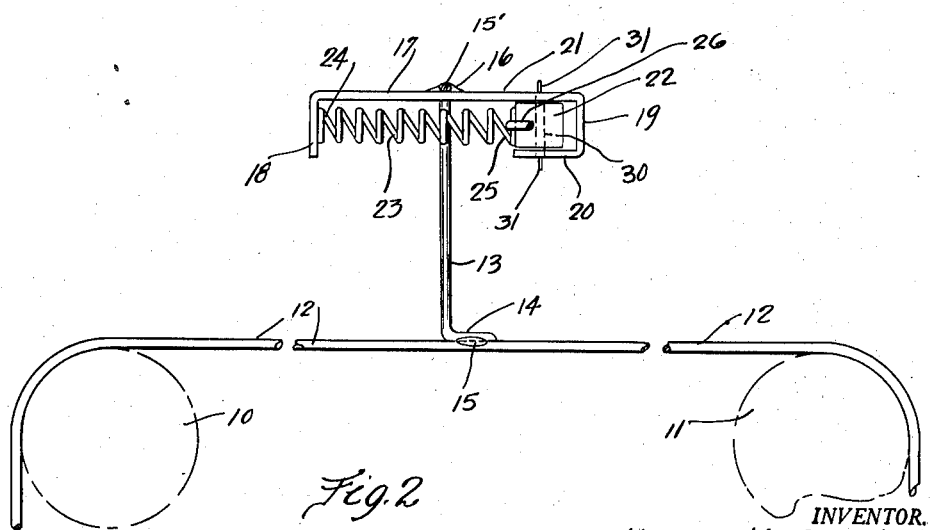
Fig. 2 is a fragmentary top plan view taken substantially on line 2—2 of Fig. 1.

The drawings illustrate the preferred form of construction of my invention. By this construction the several objects of the invention are accomplished. In this drawing are illustrated, somewhat diagrammatically, two pulleys or rollers 10 over which is passed a supporting wire or bail 12, the pulleys being driven in any suitable manner so that the wire 12 will travel through a given path in a horizontal plane.

Extending up from this wire at predetermined points are supporting arms, one of which is indicated at 13. This arm has a horizontal portion 14 soldered as at 15 to the wire 12, and this horizontal portion terminates into a vertical arm 15'. Midway between the opposite ends of this vertical arm 15' is fixed by the solder, 16, or the like, a bracket 17 having one end angled to provide a front flange 18 and its opposite end portion bent substantially U-shaped as at 19 to provide an outer plate 20 disposed in parallel relation with the back 21 of the bracket 17.

Positioned between the plate 20 and the back 21 of the bracket 17, within the U-shaped end portion 19, is a balance block 22. Disposed between this balance block 22 and the flange 18 is a balance spring 23. The end portion 24 of this spring 23 is secured by solder or the like to the flange 18, whereas the opposite end portion 25 of the spring is secured by solder or the like to the balance block 22. Extending upwardly from this balance block 22 is a staff 26, and mounted on the upper end portion 27 of this staff 26 by means of solder or the like is an object 29 which, in the present instance, simulates a horse-race.

The balance block 22 is pivotally supported in the U-shaped portion 19 by means of a pintle 30 having both ends flattened as at 31 to prevent its displacement.

The arrangement is such that when the wire 12 is moved in its given path, a certain amount of vibration will be created, and this vibration will be transmitted to the staff 26, which will be permitted to vibrate by virtue of the balance spring 23, and in so vibrating, the object 29 simulating the horse will likewise vibrate and give the effect of animation, to-wit, as though the horse were running along the given path travelled by the wire 12.

While the object 29 is shown and herein described as simulating a horse, it is obvious that this object may take any simple form, and therefore I do not want to be limited to the simulation of a horse.

The foregoing description discloses an animated object which may be utilized in amusement devices of different types and forms and which will greatly enhance the appeal to the player, of the device with which the invention is associated.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A device for animating an object during travel thereof comprising a movable supporting arm, a staff, a resilient structure providing connection between the staff and the arm whereby to permit vibration to be transmitted from the arm to the staff, an object to be animated carried by said staff, said structure comprising a bracket carried by the arm, a balance block carried by the bracket and supporting the staff, and a balance spring having one end portion connected to the bracket and its opposite end portion connected to the balance block.

2. A device for animating an object comprising a member adapted to travel in a given path, a supporting arm extending upwardly from said member, a bracket carried by the supporting arm, a staff, an object to be animated carried by said staff, and a resilient structure providing a connection between the bracket and the staff.

3. A device for animating an object comprising a member adapted to travel in a given path, a supporting arm extending upwardly from said member, a bracket carried by the supporting arm, a staff, an object to be animated carried by said staff, a resilient structure providing a connection between the bracket and the staff, said resilient structure comprising a spring-controlled balance block carried by the bracket and supporting the staff.

HENRY K. SANDELL.

REFERENCES CITED

The following references are of record in the file of this patent:

UNITED STATES PATENTS

| Number | Name | Date |
|---|---|---|
| 673,636 | Clawson | May 7, 1901 |
| 2,027,981 | Jensen | Jan. 14, 1936 |